3,355,514
STABILIZATION OF POLYOXYMETHYLENE WITH A POLYESTERAMIDE AND A PHENOLIC ANTIOXIDANT

Thérèse Van De Walle, Lievin, and Michel Brault, Bruay-en-Artois, France, assignors to Houillères du Bassin du Nord et du Pas-de-Calais, Douai (Nord), France, a French public establishment
No Drawing. Filed Oct. 16, 1964, Ser. No. 404,499
Claims priority, application France, Oct. 17, 1963, 950,859; June 12, 1964, 978,012
6 Claims. (Cl. 260—857)

ABSTRACT OF THE DISCLOSURE

High molecular weight polyoxymethylene is stabilized by the addition of 0.8% to 5% by weight of a polyesteramide, and a phenolic antioxidant. In a given example 1.5% by weight of a polyesteramide prepared from 0.75 mole of hexane diammonium adipate, 0.25 mole of adipic acid, and 0.25 mole of ethylene glycol, and 0.5% of 1,1-bis(4,2-hydroxy-5-methyl tertiary butyl phenyl) butane was added to a high molecular weight polyoxymethylene.

---

This invention relates to the stabilisation of polyoxymethylenes against degradation.

Polyoxymethylenes are a group of thermoplastic resins with very advantageous mechanical properties containing structural units of the formula:

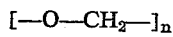

$$[-O-CH_2-]_n$$

where $n$ is an integer. These resins are however, subject to degradation, particularly under the influence of heat and the degradation processes may be divided up into three different groups:

(a) Degradation of the chain ends with liberation of gaseous formaldehyde. To obviate this degradation which takes place largely under the influence of heat, it has been shown that the presence of an ether or ester group at the end of chain prevents this degradation.

(b) Oxidation of the chains: The polyoxymethylene chains are readily oxidisable and they may be protected from this by the addition of anti-oxidants to the compositions. These anti-oxidants generally contain phenolic or amino groups.

(c) Cleavage of the chains: The chains may cleave and then also liberate formaldehyde from the cleaved ends. To obviate this, it has been proposed to add "formaldehyde acceptors." The function of these additives is to prevent degradation of polyoxymethylenes during its processing in the hot state. These additives are used in conjunction with the anti-oxidants discussed above and together with ester or ether terminated chains.

Various additives have been proposed to prevent the degradation of the polyoxymethylenes, particularly the hydrazines and their derivatives, urea, amides, such as the diamide of malonic acid, polymethacrylic amides, methyl and methacrylic amide methacrylate copolymers, and polyamides of the type obtained by the condensation of the following amines and acids:

1,1,6,6 tetramethylhexamethylene diamine/adipic acid.
2,11 diaminodecane/2-2-5-5 tetramethyladipic acid.
2,5 dimethylpiperazine/glutaric acid.
2,5 dimethylpiperazine/suberic acid.
Bis-3 aminopropylether/adipic acid.
38% polycaprolactam, 35% polyhexamethylene adipamide/27% polyhexamethylene sebacamide terpolymer.

However, these additives are not capable of being used widely unless they satisfy a number of conditions, viz:
The absence of toxicity.
A high insolubility in conventional solvents, more particularly water and stability in respect of hydrolysis.
Ease of use. In particular, an additive in an extremely divided form results in good easy homogenisation with the polyoxymethylene powder with little expense; and because of the good dispersion the finished articles tend to have no stains.

According to the present invention, we provide a thermoplastic composition which comprises a mixture of a polyoxymethylene and a polyesteramide. Preferably, the polyesteramide should constitute from 0.8 to 5% by weight on the polyoxymethylene. These polyesteramides are excellent "formaldehyde acceptors."

The production of polyesteramides is already known per se and, particularly in the case of terephthalic polyesteramides, reference may be made to the "Journal of Polymer Science," 61 (1962), 353–359, J. L. R. Williams, Laakso and Contois L. E. The polyesteramide is formed by the reaction of a diacid with a diamine, amino acid or the corresponding lactams and a diol or aminoalcohol.

If the amount of polyesteramide used is less than 0.8%, the maximum effects of the polyesteramide are not obtained, and if used in excess of 5%, the mechanical properties of the final polymer may be impaired.

All the polyesteramides used according to the invention may contain aliphatic, aromatic or cycloalkane groups. The polyesteramides with a melting point between 120° and 230° C. are the most advantageous.

According to one aspect of the invention, the polyesteramide contains groups derived from caprolactam. Such polyesteramides are produced by adding caprolactam to the reaction mixture from which the polyesteramide is to be obtained. These caprolactam-based polyesteramides are more easily dispersed and used in the polyoxymethylene, and furthermore, they also improve the injection and extrusion properties of the stabilised polyxymethylene.

The most preferred polyesteramides are those having the formula:

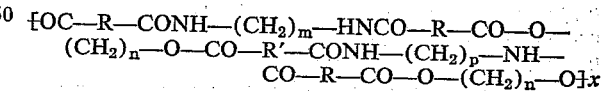

$$\{OC-R-CONH-(CH_2)_m-HNCO-R-CO-O-(CH_2)_n-O-CO-R'-CONH-(CH_2)_p-NH-CO-R-CO-O-(CH_2)_n-O\}x$$

where $m$, $n$, $p$ are integers in the range of from 1 to 12 and R is hydrocarbon and R' are divalent radicals, such as alkylene or phenylene groups; into these radicals may differ from one polymer chain to another, and $x$ is an integer.

Of these polyesteramides the most favoured are those in which R and R' are phenylene radicals and:

(a) $m=n=p=6$
(b) $m=p=6$, $n=10$
(c) $\begin{cases} m=p=6 \\ n=6 \text{ for one half of the long chain, and} \\ n=10 \text{ for the other half, substance (c) being a copolymer.} \end{cases}$ The referred polyesteramides, may be prepared by transesterifying a diester-diamide of the formula:

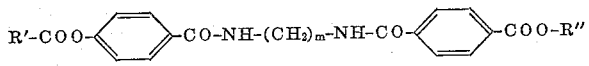

where R′ and R″ are hydrocarbon radicals with a glycol of formula HO—(CH$_2$)$_n$—OH in the presence of a transesterification catalyst.

The value of the number $n$ may be varied within the polyesteramide molecule by suitable choice of the glycol. This transesterification process gives copolymers with certain physical properties—more particularly the melting point—differing from one another as required.

The stabilised polyoxymethylenes not only have excellent stability but also a good surface gloss.

In order that the invention may be more fully understood, the following examples are given by way of illustration only.

EXAMPLE I

The following reactants were heated together in a neutral atmosphere in a stainless-steel autoclave at temperatures of 270°–290° C. for 2–3 hours at a pressure of 18 kg./cm.$^2$. After which the reaction was concluded in vacuo (0.5 mm. Hg) for 1–2 hours and the product removed from the reactor. The ingredients were:

0.75 mole of hexane diammonium adipate.
0.25 mole of adipic acid.
0.25 mole of ethylene glycol.

The resultant polyesteramide had the following characteristics: Melting point, 220° to 222° C.; intrinsic viscosity $\eta$ 0.42 was obtained.

EXAMPLE II

Using the same procedure as in Example I, but with the following ingredients:

0.65 mole of hexane diammonium adipate.
0.35 mole of adipic acid.
0.35 mole 1–6 hexanediol.

A polyesteramide having the following characteristics: Melting point, 220° C.; intrinsic viscosity $\eta$ 0.45 was obtained.

EXAMPLE III

Using the same procedure as in Example I, but with the following ingredients:

0.75 mole of hexane diammonium adipate.
0.25 mole of adipic acid.
0.25 mole of 1–6 hexanediol.

A polyesteramide having the following characteristics: Melting point, 220°–225° C.; viscosity $\eta$ 0.42 was obtained.

EXAMPLE IV

Using the same procedure as in Example I, but with the following ingredients:

0.75 mole of hexane diammonium adipate.
0.25 mole of adipic acid.
0.25 mole of 1–10 decanediol.

A polyesteramide having the following characteristics: Melting point, 225° C.; viscosity $\eta$ 0.62 was obtained.

EXAMPLE V

Using the same procedure as in Example I, but with the following ingredients:

1.1 mole of hexane diammonium adipate.
0.54 mole of adipic acid.
0.54 mole of ethyleneglycol.
1.1 mole of ε caprolactam.

A polyesteramide having the following characteristics: Melting point 180° C.; viscosity $\eta$ 0.42 was obtained.

EXAMPLE VI

Using the same procedure as in Example I, but with the following ingredients:

0.5 mole of hexane diammonium adipate.
0.25 mole of adipic acid.
0.25 mole of 1–6 hexanediol.
0.5 mole of ε caprolactam.

A polyesteramide having the following characteristics: Melting point, 170° C.; viscosity $\eta$ 0.39 was obtained.

EXAMPLE VII

Using the same procedure as in Example I, but with the following ingredients:

1.1 mole of hexane diammonium adipate.
0.54 mole of adipic acid.
0.54 mole of 1–10 decanediol.
1.1 mole of ε caprolactam.

A polyesteramide having the following characteristics: Melting point, 177°–180° C.; viscosity $\eta$ 0.65 was obtained.

EXAMPLE VIII

Using the same procedure as in Example I, but with the following ingredients:

0.25 mole of hexane diammonium adipate.
0.25 mole of adipic acid.
0.25 mole of 1–6 hexanediol.
1 mole of ε caprolactam.

A polyesteramide having the following characteristics: Melting point 130° C.; viscosity $\eta$ 0.41 was obtained.

EXAMPLE IX

Using the same procedure as in Example I, but with the following ingredients:

0.82 mole of adipic acid.
0.82 mole of 1–6 hexanediol.
4.6 mole of ε caprolactam.

A polyesteramide having the following characteristics: Melting point, 162°–165° C.; viscosity $\eta$ 0.45 was obtained.

EXAMPLE X

Using the same procedure as in Example I, but with the following ingredients:

1.1 mole of hexane diammonium adipate.
0.54 mole of adipic acid.
0.54 mole of 1–6 hexanediol.
1.1 mole of ε aminocaproic acid.

A polyesteramide having the following characteristics: Melting point, 185° C.; viscosity $\eta$ 0.48 was obtained.

EXAMPLE XI

Using the same procedure as in Example I, but with the following ingredients:

1.57 mole of hexane diammonium adipate.
0.58 mole of adipic acid.
0.58 mole of 1–10 decanediol.
0.36 mole of ε aminocaproic acid.

A polyesteramide having the following characteristics: Melting point, 220° C.; viscosity $\eta$ 0.60 was obtained.

EXAMPLE XII

Using the same procedure as in Example I, but with the following ingredients:

0.25 mole of hexane diammonium adipate.
0.25 mole of adipic acid.
0.25 mole of 1–4 cyclohexanedimethanol.
1 mole of ε caprolactam.

A polyesteramide having the following characteristics: Melting point, 120° C.; viscosity η 0.42 was obtained.

EXAMPLE XIII

Using the same procedure as in Example I, but with the following ingredients:

0.75 mole of hexane diammonium adipate.
0.25 mole of adipic acid.
0.25 mole of 1–4 cyclohexanedimethanol.

A polyesteramide having the following characteristics: Melting point, 210° C.; viscosity, η 0.44 was obtained.

EXAMPLE XIV

Using the same procedure as in Example I, but with the following ingredients:

0.25 mole of hexane diammonium adipate.
0.25 mole of adipic acid.
0.25 mole of 1–10 decanediol.
1 mole of ε caprolactam.

A polyesteramide having the following characteristics: Melting point, 150° C.; visocsity η 0.50 was obtained.

EXAMPLE XV

Using the some procedure as in Example I, but with the following ingredients:

0.25 mole of hexane diammonium adipate.
0.25 mole of hexane diammonium sebacate.
0.25 mole of 1–10 decanediol.
0.25 mole of adipic acid.
0.5 mole of ε caprolactam.

A polyesteramide having the following characteristics: Melting point, 145° C.; viscosity, η 0.58 was obtained.

EXAMPLE XVI

Using the same procedure as in Example I, but with the following ingredients:

0.5 mole of hexane diammonium adipate.
0.25 mole of sebacic acid.
0.25 mole of 1–10 decanediol.
0.5 mole of ε caprolactam.

A polyesteramide having the following characteristics: Melting point, 155° C.; viscosity η 0.55 was obtained.

The various polyesteramides were used for the stabilisation of polyoxymethylenes in various proportions.

The polyoxymethylene used in these tests was prepared by irradiation and polymerisation of solid trioxane as described in French patent specification No. 1,292,224 and its Additions 79,473, 79,665 and 80,142. This polyoxymethylene was then treated in accordance with the process described in French patent specification No. 1,333,327. The polyoxymethylene thus treated has an intrinsic viscosity of η=0.6 0.5% of 1-1 bis (4,2-hydroxy-5-methyl tertiobutylphenyl) butane (a phenolic-type anti-oxidant) was then added to the composition.

To assess the stability of the final products the resin compositions were heated at 222° C. for ½ hour, 1 hour and 2 hours respectively and the amount of product lost was determined at the end of each of these periods.

The following table shows the results with the various compounds obtained with the polyesteramides produced in each of the examples.

| Additive (by Example No.) | Percent of additive added | Percent loss 222° C. after 30 min. | Percent loss 222° C after 60 min. | Percent loss 222° C. after 120 min. |
|---|---|---|---|---|
| Control | 0 | 2.7 | 6.8 | 23 |
| Example I | 1.5 | 0.4 | 1.2 | 5 |
| Example II | 1.5 | 0.9 | 2.5 | 7.1 |
| Example III | 1.5 | 0.8 | 2.3 | 7.0 |
| Example IV | 1.5 | 0.4 | 2.0 | 7.0 |
| Example V | 1.5 | 0.4 | 0.96 | 3.98 |
| Example VI | 1.5 | 0.53 | 1.4 | 6.0 |
|  | 2 | 0.34 | 1.2 | 5.12 |
| Example VII | 2 | 0.33 | 1.0 | 5.3 |
| Example VIII | 1.5 | 0 55 | 1.78 | 5.36 |
|  | 2 | 0.32 | 1.01 | 4.9 |
| Example IX | 2 | 0.76 | 1.94 | 6.8 |
| Example X | 1.5 | 0.39 | 1.42 | 6.7 |
|  | 2 | 0.3 | 1.2 | 5 |
| Example XI | 1.5 | 0.45 | 1.57 | 7.05 |
|  | 2 | 0.38 | 1.49 | 6.29 |
| Example XII | 2 | 0.35 | 1.3 | 5.5 |
| Example XIII | 2 | 0.4 | 1.45 | 6.9 |
| Example XIV | 2 | 0.42 | 1.65 | 7.5 |
| Example XV | 2 | 0.45 | 1.8 | 7.9 |
|  | 3 | 0.39 | 1.4 | 6.5 |
| Example XVI | 2 | 0.4 | 1.65 | 7.7 |
|  | 3 | 0.3 | 1.45 | 6.6 |

To assess the above results, the following table gives the values obtained under the same conditions with various known additives.

| Additive | Percent of additive added | Percent loss 222° C. after 30 min. | Percent loss 222° C. after 60 min. | Percent loss 222° C. after 120 min. |
|---|---|---|---|---|
| Malonamide | 2 | 1.2 | 4.1 | 13.1 |
| Urea | 2 | 1.3 | 5.1 | 15 |
| Terpolymer: 38% polycaprolactam, 35% polyhexamethylene adipamide/27% polyhexamethylene sebacamide | 2 | 0.9 | 2.7 | 8.2 |

A comparison of these tables shows the superior results obtained with the polyesteramide additives. Other tests were carried out with certain polyesteramides and the thermal stability of the polyoxymethylene compounds obtained was measured by the following test:

0.2 g. of the product undergoing test (stabilised polyoxymethylene) was placed in a test-tube which was then fitted in the inner casing of a thermostatic jacket; this inner casing was 22 cm. long and had an inside diameter of 2.8 cm. The temperature of the jacket was set to 222° C. by boiling methyl salicylate. During the measurement the test-tube containing the product (length 100 mm., outside diameter 10 mm., inside diameter 8 mm.), of Pyrex glass, was held in a vertical position inside the jacket by a metal coil suspended from the jacket plug, its bottom end being 2 cm. above the bottom of the casing. Half an hour after the test-tube had been fitted in the inner casing of the jacket the test-tube was withdrawn and the loss of weight was measured. The loss per minute for 100 g. of the product was calculated and this calculated value S has been given below in Examples XVII to XXI for the various products under test.

The gloss of the final products obtained was also measured with a "Gardner Gloss Meter." This meter is specially designed for this purpose and complies with the American ASTM Standard D 523–53 T; the gloss was measured by this method at an incidence of 60° (B 60 value indicated below) and an incidence of 45° (B 45 value below).

The polyoxymethylene treated in these examples was the same as that treated in the above examples. The anti-oxidant used was 0.5% of bis-[2-hydroxy-3-(methyl-2-cyclohexyl)-5-methylphenyl] methane.

In the following examples a polyesteramide of the following formula was used:

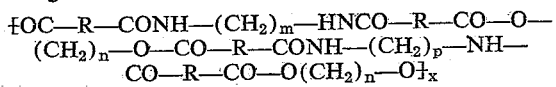

where R, m, n and p are as stated in the examples.

EXAMPLE XVII

The polyoxymethylene contained 1% of the polyesteramide where: $m=n=p=6$, and R is a para-disubstituted phenyl radical.

The following results were obtained: $S=0.03$; $B60=6.2$; $B45=9.0$.

EXAMPLE XVIII

Using the same treated polyoxymethylene containing 1.5% of polyesteramide wherein: $m=p=6$; $n=10$ and R is a para-disubstituted phenyl radical.

The following results were obtained: $S=0.027$; $B60=6.0$; $B45=8.6$.

EXAMPLE XIX

Using the same treated polyoxymethylene containing 1.5% of a polyesteramide copolymer wherein: $m=p=6$; $n=6$; $n=10$ (half the total quantity of glycol was used with $n=6$ and the other half with $n=10$); and R is a para-disubstituted phenyl radical.

The following results were obtained: $S=0.03$; $B60=6.3$; $B45=9.4$.

EXAMPLE XX

The same polyoxymethylene was used with an addition of a polyesteramide obtained by the action of the following diesterdiamide on glycol:

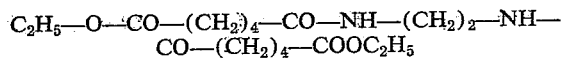

The melting point of this polyesteramide was 170° C. and its viscosity $\eta$ was 0.4.

The addition of 2% of this polyesteramide to the polyoxymethylene gave a composition with a loss at 222° C. as follows: After 30 minutes, 0.6%; after 60 minutes, 1.9%; after 120 minutes, 8%.

EXAMPLE XXI

Using the same treated polyoxymethylene containing 1.5% of the polyamide formed by the terpolymer: 38% polycaprolactan, 35% polyhexamethylene adipamide/ 27% polyhexamethylene sebacimide, the following results were obtained: $S=0.03$; $B60=4.9$; $B45=7.3$.

The values for this latter example are similar to those given by commercial polyoxymethylene compositions.

We claim:
1. A composition consisting essentially of a high molecular weight polyoxymethylene in admixture with a phenolic antioxidant and a polyesteramide of the formula:

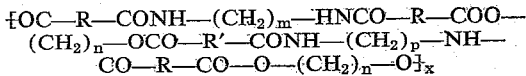

wherein m, n and p are positive integers in the range of 1 to 12, x is a positive integer, R and R' are members of the group consisting of alkylene radicals containing from 4 to 10 carbon atoms and phenylene, the polyesteramide being present in an amount of from about 0.8 to about 5.0% by weight based on the weight of the polyoxymethylene said phenolic antioxidant and polyesteramide being the sole stabilizers for the polyoxymethylene.

2. A composition of claim 1 in which the polyesteramide has a melting point of from about 120° to about 230° C.

3. A composition of claim 1 consisting essentially of a polyoxymethylene and a polyesteramide containing structural units derived from caprolactam.

4. A composition of claim 1 wherein R and R' are phenylene and m, n and p are each equal to 6.

5. A composition of claim 1 wherein R and R' are phenylene and m and p are 6 and n is 10.

6. A composition of claim 1 wherein R and R' are phenylene and m and p are 6 and n is 6 for one half of the polyesteramide chain and 10 for the other half of the polyesteramide chain.

References Cited

UNITED STATES PATENTS 3,235,624  2/1966  Green  260—857
3,288,885  11/1966  Green  260—857

OTHER REFERENCES

Kovanskaya, B. M. et al.: Chemical Abstracts, vol. 62, p. 2876 abc, 1965, Stabilisation of Polyformaldehyde.

GEORGE F. LESMES, *Primary Examiner.*

MURRAY TILLMAN, *Examiner.*

PAUL LIEBERMAN, *Assistant Examiner.*